V. LINK.
FOLDING STARTING CRANK.
APPLICATION FILED AUG. 13, 1910.
1,059,884.
Patented Apr. 22, 1913.
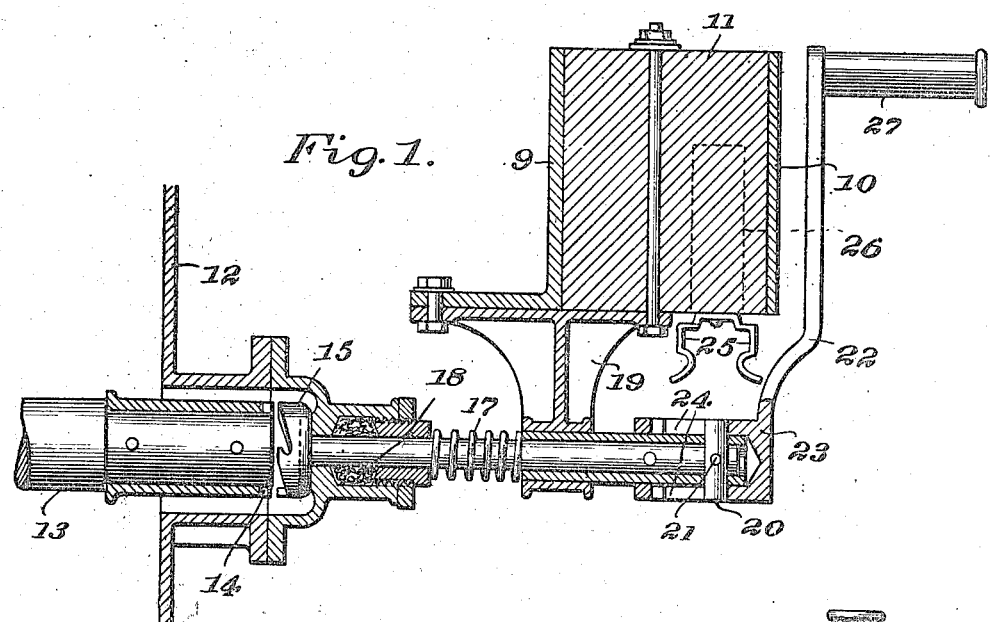
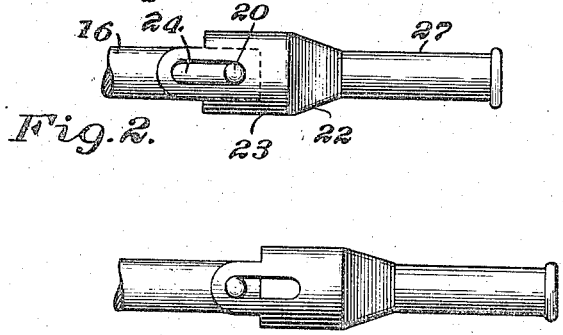
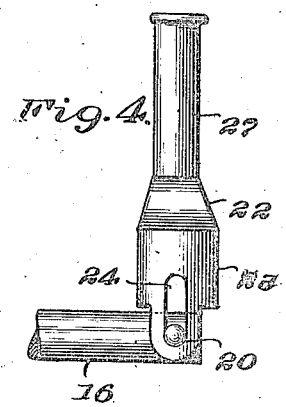
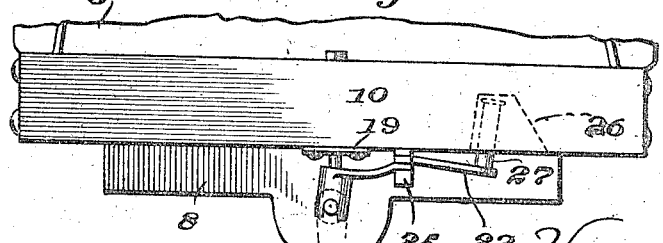
Witnesses
J. Adolph Bishop
J. H. Bruninga
Inventor
Vincent Link
By Foster Freeman Watson & Coit
Attorneys

UNITED STATES PATENT OFFICE.

VINCENT LINK, OF DETROIT, MICHIGAN, ASSIGNOR TO PACKARD MOTOR CAR COMPANY, OF DETROIT, MICHIGAN, A CORPORATION OF MICHIGAN.

FOLDING STARTING-CRANK.

1,059,884.          Specification of Letters Patent.          Patented Apr. 22, 1913.

Original application filed February 15, 1909, Serial No. 477,933. Divided and this application filed August 13, 1910. Serial No. 577,118.

*To all whom it may concern:*

Be it known that I, VINCENT LINK, a citizen of the United States, and resident of Detroit, Wayne county, State of Michigan, have invented certain new and useful Improvements in Folding Starting-Cranks, of which the following is a specification.

This invention relates to starting cranks for hydrocarbon motors, and particularly to starting cranks which are adapted to be used with truck motors.

This application is a division of my prior application, Serial No. 477,933, filed February 15, 1909.

In most trucks in which the crank shaft of the motor is arranged longitudinally near the front of the vehicle, a starting crank in employed which projects forwardly of the frame in order that it may be in convenient position for cranking the motor. On account of its position therefore, the starting crank is frequently bent or broken by contact with obstructions met with in the use of the truck. Detachable starting cranks have been used to some extent but are unsatisfactory because they are liable to be lost. One of the objects of the present invention therefore is to provide a starting crank which will project beyond the frame in a convenient position for use in starting the motor, and which when not in use may be folded to a safe position within the margin of the frame and where it will be protected from accidental injury. Notwithstanding its ability to fold, the structure of the crank is such that it makes a firm and rigid connection with the starting crank when in operative position.

The invention will be described in connection with the accompanying drawings, in which—

Figure 1 is a vertical longitudinal section through the forward part of a truck frame and the starting crank connections; Fig. 2 is a bottom view of the starting crank shown in Fig. 1; Fig. 3 is a similar view to Fig. 2 with the starting crank ready to fold; Fig. 4 is a similar view to Fig. 2 with the starting crank folded; and Fig. 5 is a front view of a part of the truck frame showing the handle in two positions.

Referring to the drawings, 9 designates a cross bar which has secured thereto by a steel strap 10 a wood beam 11. Where the invention is used in a motor vehicle, the bar 9 forms a cross bar of the frame, and the wood beam 11 and the strap 10 act as a front bumper which takes the shocks due to collisions with vehicles or other obstacles in the operation of the truck. A fragment of the motor crank case 12 is shown housing the crank shaft 13 on the forward end of which is a clutch member 14, which coöperates with a clutch member on the rear end of a starting shaft.

The starting shaft is designated by the reference character 16 and is provided with a clutch member 15 which is arranged to coöperate with the clutch member 14 on the crank shaft previously referred to. The starting shaft is yieldingly held in inoperative position by a suitable spring 17 and this shaft is journaled in a suitable packed bearing 18 in the forward end of the crank case and in a bracket 19 bolted to the cross bar 9 and the beam 11. A transverse cylindrical key 20 passes through a suitable opening near the forward end of the starting shaft 16 and is secured thereto by a pin 21. The starting crank 22 is formed with a hollow cylindrical hub 23 which is adapted to laterally fit the forward end of the starting shaft and is provided with oppositely disposed longitudinal slots or key ways 24 in which the projecting ends of the key 20 are adapted to slide. The rear end of the hub 23 is somewhat cut away between the slots 24, thus leaving ears containing those slots, and with this construction it will be seen upon reference to Figs. 1 and 5 that the crank may be drawn forward relative to the shaft 16 from its position shown in Figs. 1 and 2 to the position shown in Fig. 3, and when in said latter position the crank may be turned bodily on the key 20 as a pivot into the position shown in Fig. 4, wherein the hub of the starting crank is at a right angle to the starting shaft. As the shaft 16 is wholly within the forward edge of the beam and its plate 10, the starting crank when folded to the position shown in Fig. 4 is also within the forward edge of said beam and may be then turned to the position shown in Fig. 5 in full lines, and secured against the beam by spring clip 25. For convenience in holding the starting crank closer to the beam, an opening 26 is made in the wood to house the handle 27 of the starting crank as shown in Fig. 5. The construction of the spring clip 25 and the method of securing the handle in position underneath the beam is fully shown in the drawings and need not be further described.

It will be noted that a rearward force applied to the crank will lock the same against folding movement on the starting shaft while a forward movement will unlock the same, so that it can be moved to folded position. This is a convenient arrangement since a rearward movement is necessarily given to the crank and the starting shaft, so as to clutch the starting shaft with the crank shaft. Therefore by applying a rearward force to the crank, the crank is simultaneously locked on the starting shaft, and the starting shaft is thrown into engagement with the crank shaft.

It will thus be seen that this invention provides a very convenient starting crank which is accessible for operation and can at any time be moved to a position where it will be protected by the beam 11 against damage.

Although this invention is specially applicable to motor vehicles, it will be seen that it is not necessarily limited to such an application, but may be used wherever a starting crank is desirable. It is further obvious that various changes may be made in the details of construction without departing from this invention, and it is, therefore, to be understood that this invention is not to be limited to the specific construction shown and described.

Having thus described the invention, what is claimed is:

1. The combination with a hydrocarbon motor, of a normally-idle starting shaft therefor, and a folding starting crank secured to said shaft, and adapted to move about an axis at right angles to said shaft in moving to and away from folded position.

2. The combination with a hydrocarbon motor, of a normally-idle starting shaft therefor, and a folding starting crank pivoted to the end of said shaft and adapted to swing about an axis at right angles to the shaft to folded position.

3. The combination with a hydrocarbon motor, of a normally-idle starting shaft therefor, a starting crank having a hub, a sleeved connection between said shaft and hub, and means whereby said crank may be moved at right angles to said shaft to folded position.

4. The combination with a hydrocarbon motor, of a normally-idle starting shaft therefor, a starting crank having a hub with a sleeved end, a pin and slot connection between said shaft and hub, and means, connecting the crank and hub, permitting the crank to be moved about said pin to folded position.

5. The combination with a hydrocarbon motor, of a normally-idle starting shaft therefor, a folding crank secured to said shaft and slidable axially thereon, and means for locking said crank in operative position on said shaft when the crank is moved axially of the shaft.

6. The combination with a hydrocarbon motor, of a normally-idle starting shaft therefor, a folding crank secured to said shaft and slidable axially thereon, and means, for locking said crank in operative position on said shaft, adapted to be released by an axial movement of the crank on the shaft.

7. The combination with a hydrocarbon motor, of a starting shaft therefor, a folding starting crank, and a fixed pivot pin extending transversely of said shaft and forming a pivot for said crank.

8. The combination with a starting shaft, of a starting crank having a sleeve slidably engaging the end of said shaft and keyed to rotate therewith, means for limiting the sliding movement of said sleeve, and means permitting the folding of said sleeve and crank at right angles to the shaft when they reach the limit of their forward movement.

9. The combination with a starting shaft, of a starting crank having a sleeve slidably engaging the end of said shaft and keyed to rotate therewith, ears upon opposite sides of said sleeve projecting beyond the end thereof, and embracing said shaft, and pivotal connection between said ears and the end of said shaft whereby the crank may be folded when in its forward position.

10. The combination with a shaft, of a crank having a sleeve slidably engaging the end of said shaft, oppositely disposed ears upon said sleeve projecting beyond the end thereof, the said sleeve and ears being provided with longitudinal slots, and a cross pin in the end of said shaft working in said slots whereby the crank may be folded when in its forward position without being disconnected from said shaft.

11. The combination with a shaft, of a crank having a sleeve slidably engaging the end of said shaft and keyed to turn therewith, and means pivotally connecting said sleeve to the shaft when it reaches the outer limit of its sliding movement, the said sleeve having a cutaway portion at its end permitting it to fold at right angles to the shaft.

12. The combination with a starting shaft, of a starting crank therefor, a protective member, and means whereby said crank may be folded to a position within the margin of said member.

13. The combination with a starting shaft, of a starting crank therefor, a protective member, means whereby said crank may be folded to a position within the margin of said member, and means for securing the folded crank to said member.

14. The combination with a starting shaft, of a starting crank therefor having a handle, a protective member provided with a recess, and means whereby said crank may be folded to a position within the margin of said member with the handle in the recess.

15. The combination with the crank shaft of an automobile, of a longitudinally movable starting crank pivotally supported by the automobile and adapted to be swung around an axis at right angles to the crank shaft.

16. The combination with the crank shaft of an automobile, of a longitudinally movable starting crank pivotally supported by the automobile and adapted to be swung around an axis at right angles to the crank shaft to an inoperative position, and means for holding the crank in said position.

In testimony whereof I affix my signature in presence of two witnesses.

VINCENT LINK.

Witnesses:
AUSTIN L. RICHARDSON,
S. E. LYONS.

Copies of this patent may be obtained for five cents each, by addressing the "Commissioner of Patents, Washington, D. C."